Jan. 5, 1932.   O. ERNST   1,840,026
AUTOMOBILE
Original Filed Aug. 8, 1927   2 Sheets-Sheet 1
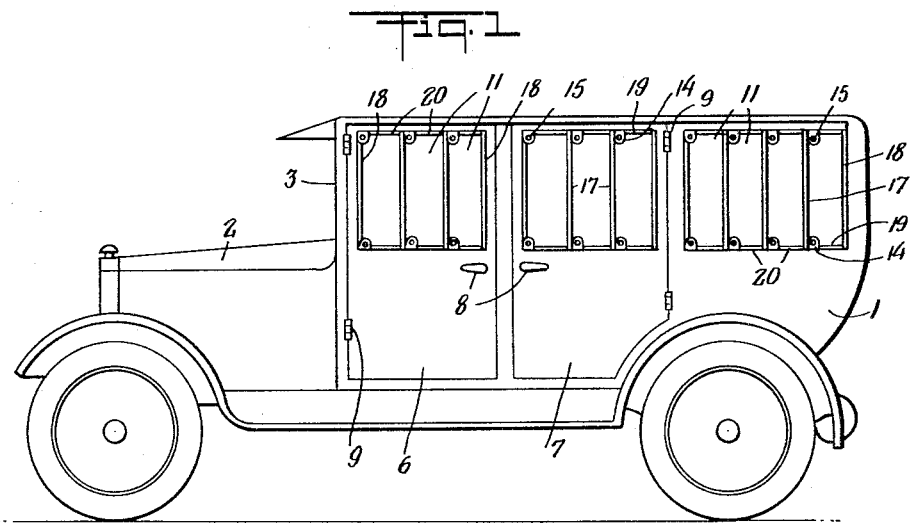
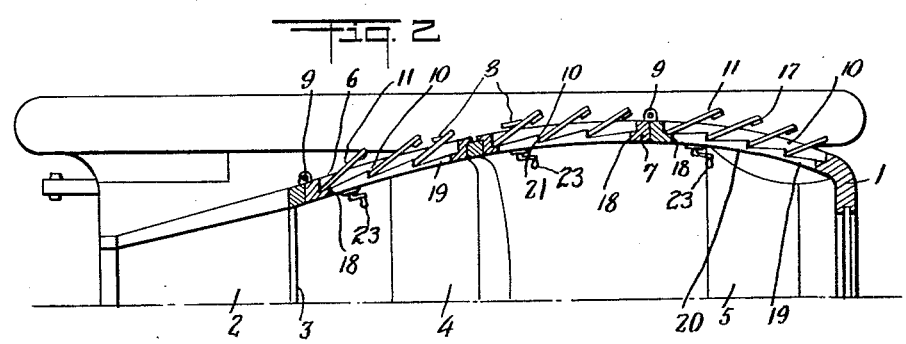
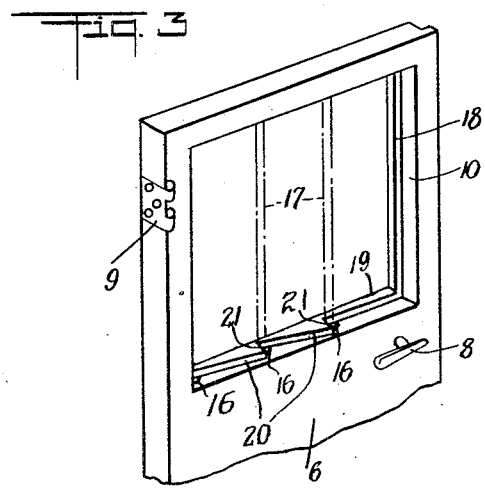
INVENTOR
Otto Ernst
BY
William F. Nickel
ATTORNEY Jan. 5, 1932.  O. ERNST  1,840,026
AUTOMOBILE
Original Filed Aug. 8, 1927   2 Sheets-Sheet 2
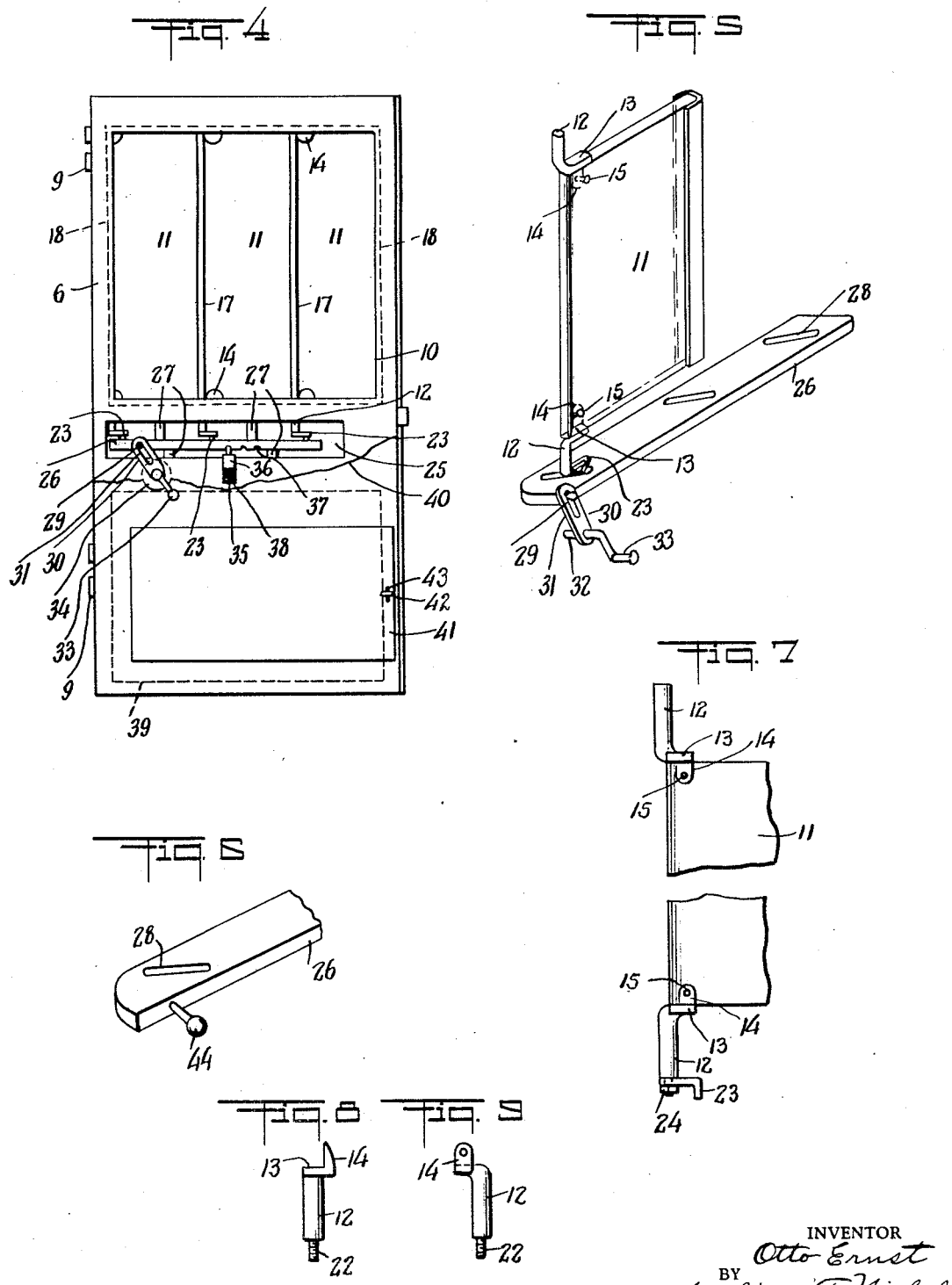
INVENTOR
Otto Ernst
BY William F. Nickel
ATTORNEY Patented Jan. 5, 1932

1,840,026

REISSUED

UNITED STATES PATENT OFFICE

OTTO ERNST, OF LARCHMONT MANOR, NEW YORK

AUTOMOBILE

Application filed August 8, 1927, Serial No. 211,523. Renewed August 12, 1931.

This invention relates to improvements in automobiles and other vehicles; particularly automobiles having a closed body with windows that can be opened or shut, and held in such positions as the occupants wish.

An object of this invention is to provide a closed automobile equipped with windows that can easily be operated to admit air in the volume required for the proper ventilation of the car, without giving rise to a direct draft which might injuriously affect the occupants; thus enabling the temperature and other conditions on the interior to be nicely regulated and the comfort and safety of the persons riding in the car to be increased.

A further object is to provide means for enabling the windows to be conveniently manipulated so as to open the windows to the required extent and keep them in the position to give the desired results.

Other objects and advantages of my invention are set forth in the following description, and the novel features thereof are defined in the appended claims. But this disclosure is illustrative only, and I may vary the construction, without departing from the scope and principle of the invention, to the full extent permitted by the broad and general meanings of the terms in which the claims are expressed.

On the drawings:—

Figure 1 is a side elevation of the body of a closed car according to my invention;

Figure 2 is a top view partly in section of the same; only one-half of the car appearing;

Figure 3 presents a perspective view of part of one of the doors of the car;

Figure 4 is a side elevation of another door as it appears from the inside of the car;

Figure 5 is a perspective view of the means for operating the windows;

Figure 6 shows a modification of such means.

Figure 7 is a fragmentary view showing how the windows are mounted; and

Figures 8 and 9 are side and end views of the journals on which the windows are supported.

The same numerals identify the same parts throughout.

The invention set forth herein is of a type similar to what is disclosed in my previous application Serial No. 672,232 filed October 23, 1923.

The body of the car is indicated at 1, part of the motor hood at 2, the windshield or glass front of the body at 3; the front seat at 4, and the rear seat at 5. Also the car is shown as having front doors 6, one at each side, and rear doors 7, each furnished with a knob or handle 8 and hung on hinges 9.

Each of the doors has an opening 10 and each side has a similar opening to the rear of the doors 7. The openings are each filled with several panes of glass 11, each pane pivoted adjacent the upper and lower ends of its forward edge. When the panes are swung outward, air can flow into the car, and when swung inward, the openings 10 will be closed.

The panes 11 in each aperture 10 constitute a complete window for that opening and to mount each window pane so that it can be moved as desired, I may attach to the top and bottom edges thereof journals 12 riveted fast thereto. These journals turn in bearings in the top and bottom of the openings 10.

Each journal is preferably an integral part of a support which comprises a plate 13 and a perforated projection 14; and each of the supports may be secured to panes 11 by means of a rivet 15 passing through the perforated projection 14. Each support can be made in one piece and the plate 13 thereof is fitted against one horizontal edge of the pane to which the supports are attached, as shown in Figures 5 and 7, with the end of the plate 13 flush with the vertical forward edge of the associated pane 11; that is, the edge which is presented to the front of the automobile. The relations of the position of the plates 13 and journals 12 are such that, when the supports are affixed to the panes by riveting the supports to the upper and lower edges thereof, the forward edge of each plate will be in line with the axes of the two journals 12. These journals will fit into bearings 16 in the top and bottom edges of the openings 10.

Around the inner edges of the openings 10 will be vertical ribs or flanges 18 at each side, these ribs being straight. The ribs in question are shown in Figures 1, 2, 3 and 4; and at the forward side of each window opening the forward pane nearest to the front of the automobile will have its forward edge to fit against the adjacent rib 18 while the rearmost pane in said opening located toward the rear of the opening or the car will have its rear edge in engagement with the other vertical rib 18 when the window is closed by shutting these panes 11. The top and bottom edges of the openings 10 will also have ribs such as shown in Figure 3 but these ribs will not be straight throughout their length; but part of these horizontal ribs at the top and bottom of each opening adjacent the rear or free edge of the door will be straight, as shown at 19, and parallel with the plane of the door; while the remaining portions of these two ribs will be diagonal to some extent, as shown at 20, to provide shoulders 21.

As will appear from an inspection of the drawings, the door shown in part on Figure 3 is an outside view of part of the front door on the side of the car seen by the observer in Figure 1, while the door shown in Figure 4 is an inside view of the front door on the opposite side of the automobile, but the openings and the disposition of the flanges 18 and the flanges or ribs comprising the portions 19 and 20 will be the same in all the doors and openings 10. The bearings 16 for the middle pane and the pane to the rear thereof of each door will be located adjacent the shoulders 21 at both the top and bottom of the opening 10; while the bearing 16 for the foremost pane in these openings will be adjacent the rib 18 at the forward edge of the doors 6 and 7. For the forward pane of each opening the supports, including the journals 12, may be so attached to the top and bottom of that pane that the forward or hinged vertical edge instead of being in line with the axes of the two journals 12 will be in line with the outside of same; that is to say, with reference to Figure 7 the supports will be farther to the right so that the forward edge of this pane may fit more snugly against the adjacent rib 18. Both ribs 18 and the portions of the ribs 19 and 20 in all the openings 10 will be faced with packing so that the panes 11 when they are swung inward to close the openings will fit snugly and make the window draught-proof. Further in each opening all of the panes, except the rearmost pane or the pane which is nearest to the rear end of the car, may be provided on the inner faces and along the rear or free edge of same with a packing strip 17. When the panes are closed the location of these packing strips will be as indicated partly in Figure 3, that is, each packing strip will overlap and be in contact with the hinged edge of the adjacent pane to the rear of it. Thus all parts of the windows can be closed tight. Hence the necessity for the shoulders 21 and inclined portions 20 which are provided so that when the panes are closed and the packing strips 17 each make contact with the pane to the rear, the inclined portions 20 of the upper and lower ribs or flanges, with the packing thereon may snugly engage the top edges of the panes. The two doors 6 and 7 may each have three panes and the rearmost opening 10 may have four such panes. This rearmost opening 10 will, of course, be like the openings in the doors except that it will have three shoulders 21 and corresponding inclined portions 20.

Thus when the panes in the window openings 10 are swung outward around their forward edges as axes on the journals 12, they assume the position shown in Figure 2 with their rear edges disposed beyond the sides of the car and as the car moves the air is drawn out between these panes and air entering the car does so indirectly and creates no direct draught. The rear edges of the panes can be swung outward to a greater or less extent, as desired, and the windows can be shut or kept wholly or partly open by securing the panes in adjusted position. All the panes can be moved in unison by suitable actuating means which I shall now describe.

To connect the actuating means with the various panes of each opening 10 the journals 12 attached to the bottoms of the panes 11 may have threaded projections 22 which are passed through perforations in crank arms 23 and the cranks are held on fast by the nuts 24. These cranks are all located in the recess 25 on the inside of each door and in the sides of the car below the two rear windows which have four panes 11 instead of three. The cranks are engaged by an operating bar 26 mounted to slide back and forth in contact with bearings 27 in the recess 25 and in the bar 26 adjacent each crank or projection 23 is a diagonal slot 28. By referring to Figure 5, which shows the operating means as connected to a pane of glass 11 which is presented as any one of the panes 11 on the right-hand side of the car will appear to one of the occupants, the connection of the operating means to the panes of the various openings 10 will be clear. The recess 25 for each window is located just below the bottom edge of the window with the member 26 slidably mounted therein, and this bar may have at any convenient point a pin or projection 29 connected to a lever 30 by passing into a slot 31 thereof. This lever will have one end rigid with shaft 32 of crank 33. One end of this shaft will fit into a bearing of the door below the recess 25 and the other end bearing the crank will extend through the covering or upholstery for the inside faces of the doors and the inside of the car adjacent the two rear windows 10 and may be surrounded between the crank and the lever 30 with a round plate 34. This plate 34 will be over the upholstery or covering and may act as another bearing for the shaft 32 adjacent the crank 33. Obviously, with the parts in the position of Figure 5 if the crank is moved to the left or toward the front of the car, the bar 26 will act on the cranks 23 through the slots 28 that the panes will be swung to open position. Of course the length and angle of the slots 28 and the size of the cranks 23 can be designed to make the panes 11 open as much as possible. I also mount in a recess 35 in the bottom of recess 25 a spring pressed part in the form of a pin 36, the end of which goes into notches or spaces 37 in the bottom of the bar 26. This pin 36 is pushed by a spring 38 to engage the notches 37 and hold the bar releasably so as to secure the panes in the desired position. Thus the windows can be partly open or fully open and to open and shut same one only turns the crank 33; as the bar in sliding back and forth will push the rounded end of the pin 36 down as required.

With this design of window I can ventilate the car fully and properly and keep the air fresh and pure without uncovering any opening in a manner that will allow a direct draught of air to enter the car. The mechanism for moving the panes 11 does not take up much space and the lower part of each door and sides of the car below the large rear windows, if desired, may be provided with pockets 39, as shown in Figure 4, which will be closed by the upholstery or the covering for the interior of the doors and walls of the car as indicated in part at 40 on Figure 4. Each pocket may have a hinged closure 41 to be held closed by a latch 42 that passes through a slot 43 in the cover 41. By turning this latch 42 to register with the slot 43 the closure 41 can easily be opened to give access to the pocket. Hence all the space below the windows which is now needed to receive sliding panes of glass when same are moved to open the windows in present arrangements, is saved in the practice of my invention and made available for pockets which can be conveniently used for various articles that the motorist needs.

Instead of utilizing crank 33 as shown in Figure 5, I can provide the bar 26 with the knob 44 which will extend out through a slot in the upholstery over the recess 25; but as such a slot is always partly open the crank 33 is preferable.

The details of construction, shape, size and arrangement of parts herein set forth show but one embodiment of my invention, and various other modes of practicing same may be adopted. I do not wish to be limited to the particular type of connections for operating the windows which are above described, or mounting the panes 11 or enabling the openings 10 to be made draft-proof when the windows are closed; since what I wish to reserve is the principle of the device, as the claims define same.

My invention can be used upon not only automobiles, but also upon the cabins of airships, airplanes, marine vessels, and in fact any kind of carrier used in transportation.

Having described my invention what I believe to be new and desire to secure and protect by Letters Patent of the United States is:

1. A vehicle having an opening for a window, and a rib or flange at the edge of the opening, said rib having shoulders at different points along its length, said rib having edge portions out of alinement between said shoulders.

2. A vehicle having an opening, window panes mounted on journals in said opening, cranks attached to some of said journals to swing the panes open or shut, an actuating bar connected to said cranks, a bar having diagonal slots to receive said cranks, an element to move said bar, the latter also having notches, and a spring pressed pin to engage the notches and hold the bar and panes in adjusted position.

3. A vehicle having an opening, a window comprising panes mounted to swing about vertical axes in said opening, the axes being disposed at the edges of the panes presented to the front of the vehicle, means connected to said panes adjacent said axes to actuate said panes in unison, and a part releasably mounted to cooperate with said means and hold the panes releasably in adjusted position.

4. A vehicle having an opening, a window comprising panes mounted to swing about their forward edges in said opening, means for actuating said panes in unison to open and close same, means for releasably holding said panes in adjusted position, the opening having a flange adjacent its edge, the flange having one or more shoulders adjacent the forward edges of some of said panes, and packing strips on the rear edges of some of said panes.

5. A vehicle having an opening, a window comprising panes mounted to swing about vertical axes in said opening, cranks attached to the panes adjacent the axes, an actuating bar connected to the cranks, said bar and said cranks being housed adjacent the opening, and an element to move the bar and swing the panes in said opening.

6. A vehicle having an opening, a window comprising panes mounted to swing about upright axes in said opening, said axes being disposed adjacent the edges of the panes presented to the front of the vehicle, journals at the ends of said axes for pivotally supporting said panes in the opening, and means comprising lateral projections adjacent the lower ends of said axes and a member connecting all of said projections to actuate all the panes in unison to open or closed position, said means being housed in the side of the vehicle below said opening, and means for holding the panes in adjusted position.

In testimony whereof I affix my signature.

OTTO ERNST.